(12) United States Patent
Heaton

(10) Patent No.: US 9,556,908 B2
(45) Date of Patent: Jan. 31, 2017

(54) CAGE ELEMENT FOR ROLLING BEARING ASSEMBLY

(71) Applicant: Schaeffler Technologies AG & Co. KG, Herzogenaurach (DE)

(72) Inventor: Michael Heaton, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/678,088

(22) Filed: Apr. 3, 2015

(65) Prior Publication Data

US 2016/0290399 A1 Oct. 6, 2016

(51) Int. Cl.
*F16C 33/37* (2006.01)
*F16C 33/51* (2006.01)
*F16C 19/26* (2006.01)
*F16C 33/46* (2006.01)

(52) U.S. Cl.
CPC .............. *F16C 33/51* (2013.01); *F16C 19/26* (2013.01); *F16C 33/4676* (2013.01)

(58) Field of Classification Search
CPC ... F16C 33/3818; F16C 33/37; F16C 33/3706; F16C 33/374
See application file for complete search history.

(56) References Cited

U.S. PATENT DOCUMENTS

| | | | | |
|---|---|---|---|---|
| 1,261,154 A | * | 4/1918 | Newmann | F16C 19/20 384/520 |
| 2,893,792 A | * | 7/1959 | Wikoff | F16C 19/20 384/520 |
| 2,897,021 A | * | 7/1959 | Zeilman | F16C 19/20 384/520 |
| 4,022,516 A | * | 5/1977 | Smith | F16C 19/163 384/520 |
| 4,896,974 A | * | 1/1990 | Shimizu | F16C 19/362 384/44 |
| 6,513,978 B2 | * | 2/2003 | Shirai | F16C 33/3706 384/45 |
| 8,651,810 B2 | * | 2/2014 | Habibvand | F04B 15/08 415/229 |
| 2014/0314574 A1 | * | 10/2014 | Sheard | F04D 29/05 416/147 |

FOREIGN PATENT DOCUMENTS

| | | | | |
|---|---|---|---|---|
| DE | 849048 C | * | 9/1952 | F16C 19/20 |
| DE | 10315219 A1 | * | 10/2004 | F16C 33/3706 |
| DE | WO 2011117076 A1 | * | 9/2011 | F16C 33/3706 |
| FR | 352596 A | * | 8/1905 | F16C 19/20 |
| FR | 1104502 A | * | 11/1955 | F16C 19/20 |
| GB | 124246 A | * | 3/1919 | F16C 19/20 |

* cited by examiner

*Primary Examiner* — Thomas R. Hannon
(74) *Attorney, Agent, or Firm* — Volpe and Koenig, P.C.

(57) ABSTRACT

An improved cage element for a cage arrangement in a rolling bearing assembly including rolling elements is provided. The cage element includes a cylindrical middle portion, a first end portion including a first concave outer surface shaped to support a rolling element, and a second end portion including a second concave outer surface shaped to support the rolling element. The first and second end portions are arranged on opposite ends of the cylindrical middle portion, and the first and second concave outer surfaces have identical curvatures.

16 Claims, 4 Drawing Sheets

CAGE ELEMENT FOR ROLLING BEARING ASSEMBLY

FIELD OF INVENTION

The present invention relates a rolling bearing assembly, and is more particularly related to a cage element for a rolling bearing assembly.

BACKGROUND

Rolling bearing assemblies are used in a variety of applications. Depending on the particular application, a cage may be required to space the rolling elements apart from each other for equal load distribution and/or to provide guidance for the rolling elements as they run between the radially inner ring and radially outer ring. Known cages include a continuous, circular ring having a plurality of pockets for installation of the rolling elements therein. These known ring-shaped cages require significant material to form the ring and webbing surrounding each rolling element, which increases the weight of the overall rolling bearing assembly. It is also very difficult to alter the number of rolling elements that can be supported within a ring-shaped cage without significant modification. The webbing required in these ring-shaped cages reduces the overall performance of the rolling bearing assembly due to increased surface wear on the rolling elements, which causes a reduction in lubrication and increase in friction.

It would be desirable to provide a simplified, light-weight cage for a rolling bearing assembly that is easily adapted to different sized bearings and that improves lubrication flow between the rolling elements of the rolling bearing assembly.

SUMMARY

An improved cage element for a rolling bearing assembly is provided for forming a cage arrangement that improves lubrication flow, reduces the overall weight of the rolling bearing assembly, and requires less material than previously known rolling bearing cages.

In one embodiment, a rolling bearing assembly including a cage arrangement formed from a plurality of cage elements is provided. The rolling bearing assembly includes a radially inner ring defining a radially inner raceway, a radially outer ring defining a radially outer raceway, and a plurality of rolling elements supported between the radially inner raceway of the radially inner ring and the radially outer raceway of the radially outer ring. Each of the plurality of cage elements is arranged between adjacent ones of the rolling elements. Each one of the plurality of cage elements includes: a middle portion, a first end portion, and a second end portion. The end portions are arranged on opposite ends of the middle portion, and the first and second end portions each include a concave outer surface that is shaped to support a respective one of the plurality of rolling elements.

In another embodiment, an improved cage element used to form a cage arrangement for a rolling bearing assembly including rolling elements is provided. The cage element includes a cylindrical middle portion, a first end portion including a first concave outer surface shaped to support a rolling element, and a second end portion including a second concave outer surface shaped to support the rolling element. The first and second end portions are arranged on opposite ends of the cylindrical middle portion, and the first and second concave outer surfaces have identical curvatures.

Additional embodiments are described below and in the claims.

BRIEF DESCRIPTION OF THE DRAWINGS

The foregoing Summary and the following detailed description will be better understood when read in conjunction with the appended drawings, which illustrates a preferred embodiment of the invention. In the drawings.

DETAILED DESCRIPTION OF THE PREFERRED EMBODIMENTS

Figure 1:
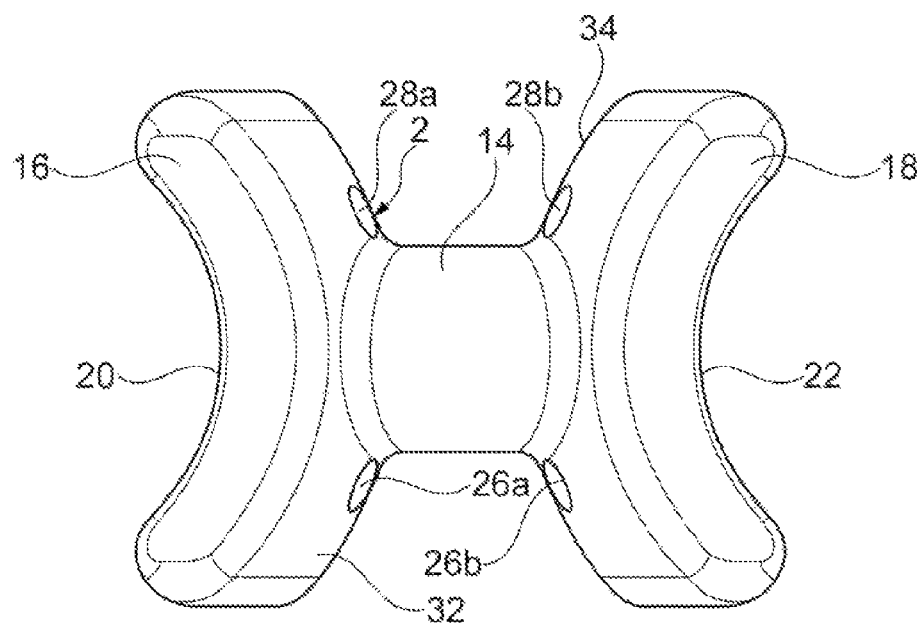
FIG. 1 shows a top view of a cage element according to an embodiment of the invention.
Figure 2:
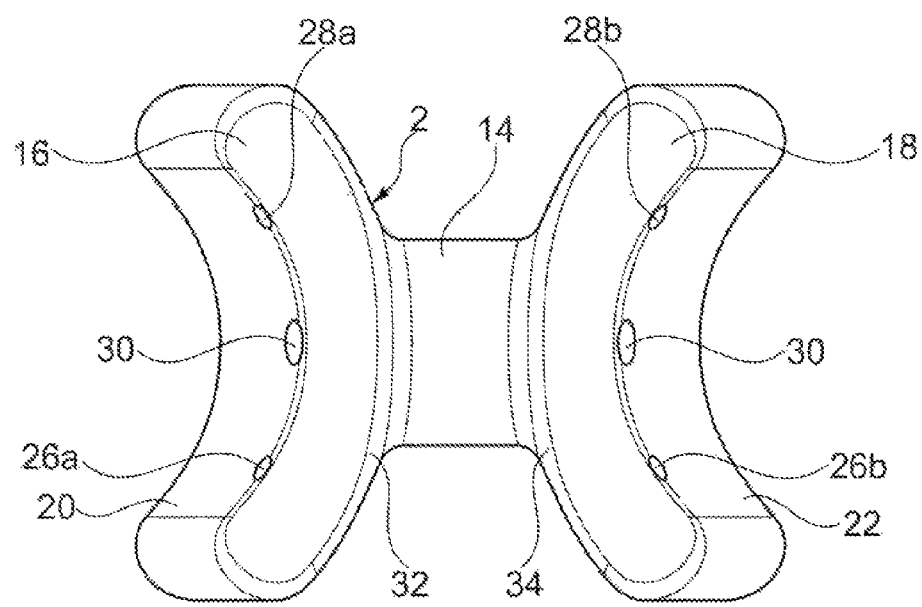
FIG. 2 shows a bottom view of cage element of FIG. 1.
Figure 3:
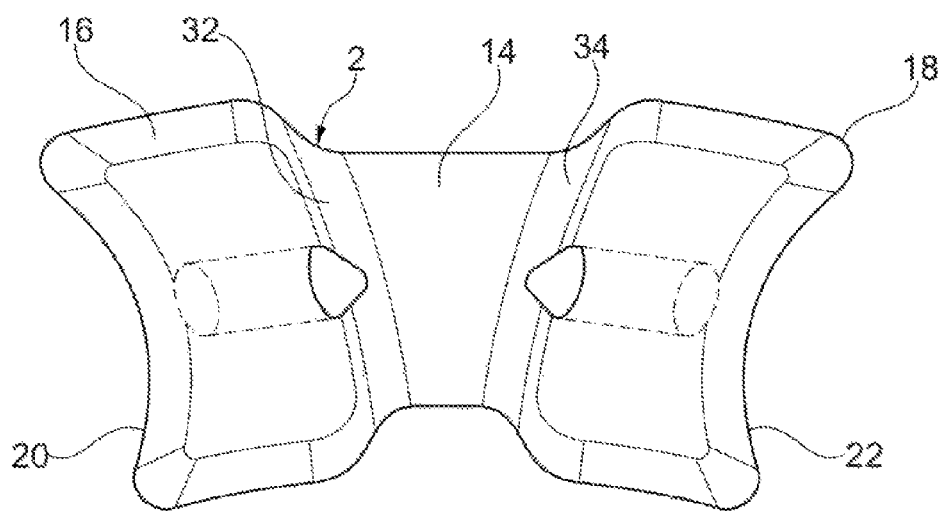
FIG. 3 shows a front view of a cage element of FIGS. 1 and 2.
Figure 4:
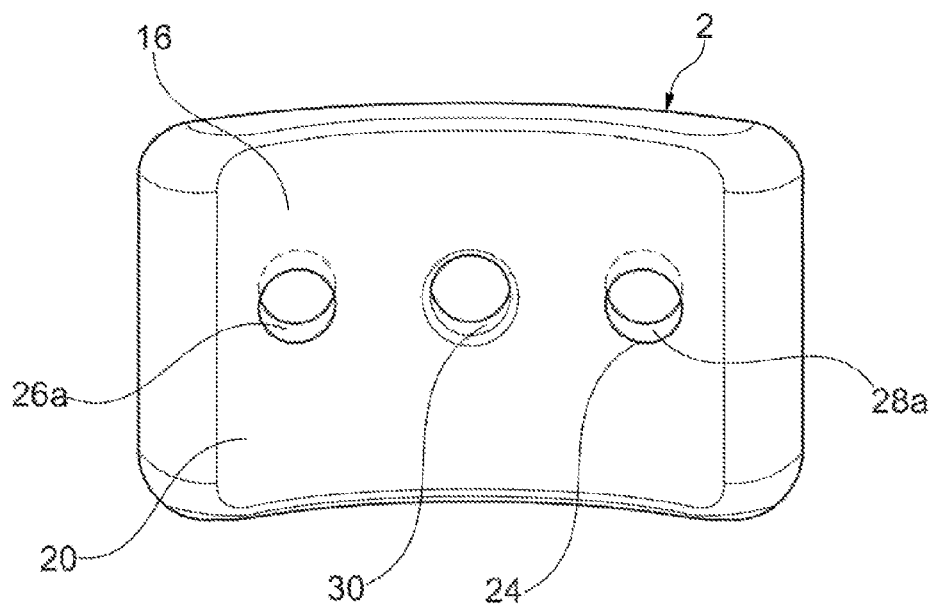
FIG. 4 shows a view of an end portion of the cage element of FIGS. 1-3.

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 5:
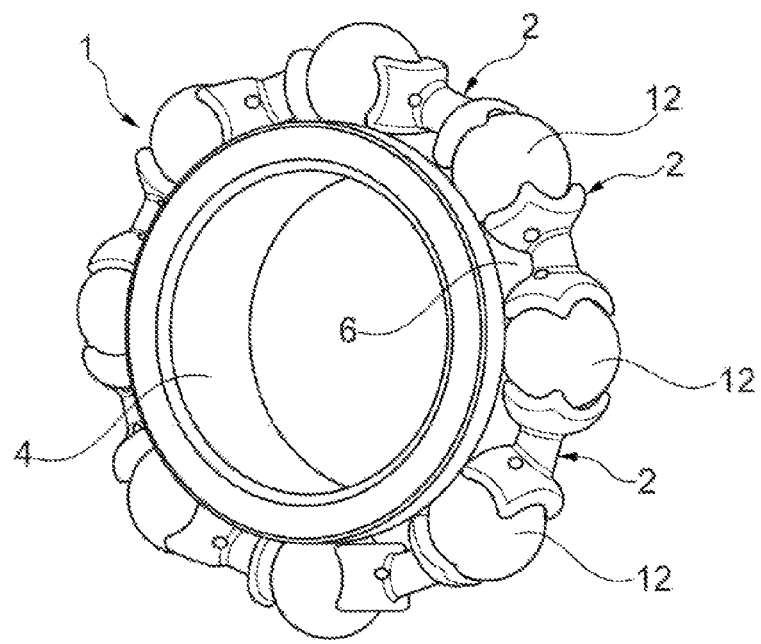
FIG. 5 shows a perspective view of a partially assembled rolling bearing assembly including a plurality of the cage elements of FIG. 1-4.
Figure 6:
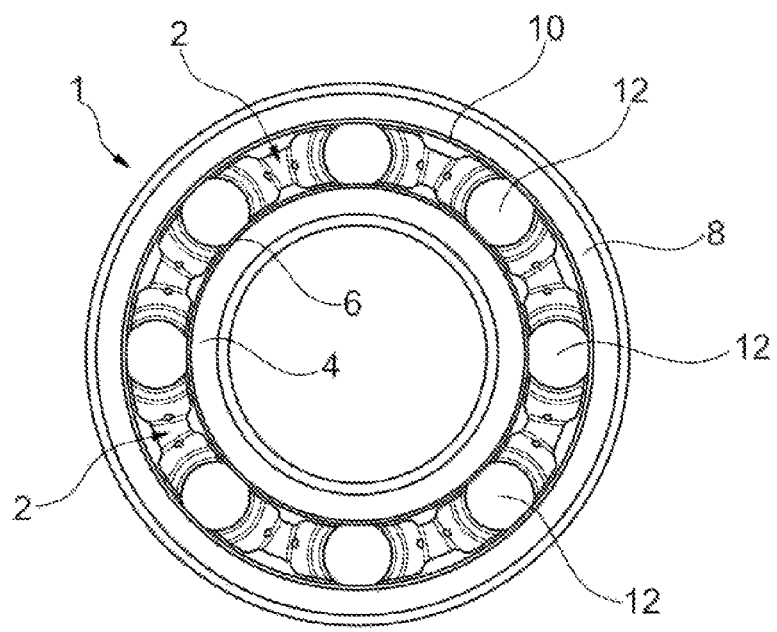
FIG. 6 shows a front view of a rolling bearing assembly including a plurality of cage elements of FIGS. 1-4.
Figure 7:
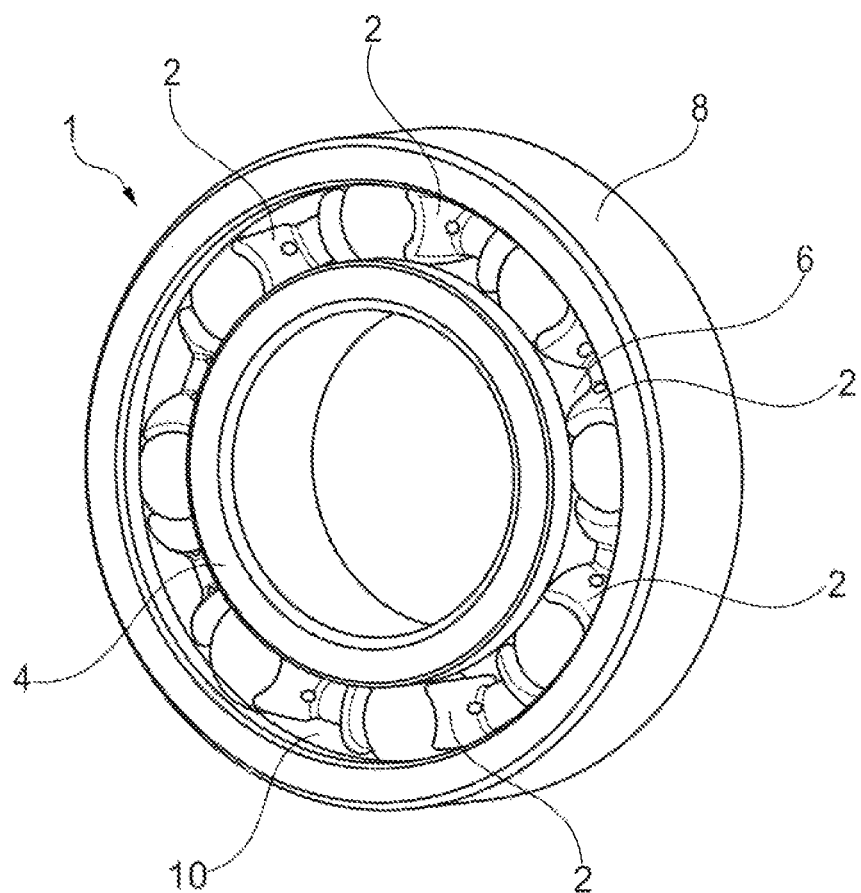
FIG. 7 shows a perspective view of the rolling bearing assembly of FIG. 6.

As shown in FIGS. 5-7, a rolling bearing assembly 1 including a cage arrangement formed by a plurality of cage elements 2 is provided. The rolling bearing assembly 1 includes a radially inner ring 4 defining a radially inner raceway 6 and a radially outer ring 8 defining a radially outer raceway 10. A plurality of rolling elements 12 are supported between the radially inner raceway 6 of the radially inner ring 4 and the radially outer raceway 10 of the radially outer ring 8. FIG. 5 shows the rolling bearing assembly 1 without the radially outer ring 8. As shown in FIGS. 5-7, the rolling elements 12 are preferably spherical rolling elements. One of ordinary skill in the art will recognize that other types of rolling elements can be used.

The rolling bearing assembly 1 includes a plurality of cage elements 2, shown more clearly in FIGS. 1-4, which are each arranged between adjacent ones of the rolling elements 12. Each cage element 2 includes a middle portion 14, a first end portion 16, and a second end portion 18, with the end portions 16, 18 arranged on opposite ends of the middle portion 14. In one embodiment, the middle portion 14 is cylindrical. Other shapes for the middle portion 14 can be used based on the application and performance requirements of a particular rolling bearing assembly. The length of the middle portion 14 can also be varied to set a particular circumferential spacing between adjacent rolling elements 12, depending on the load requirements for the rolling bearing assembly 1. In one embodiment, the first and second end portions 16, 18 each have a larger cross-sectional area than a cross-sectional area of the middle portion 14. In one embodiment, the first and second end portions 16, 18 are identical to each other. Due to the identical configuration of the first and second end portions 16, 18, the cage elements 2 can be inserted into the rolling bearing assembly 1 in either direction during assembly.

The first and second end portions 16, 18 each include a concave outer surface 20, 22 that are shaped to support a respective one of the plurality of rolling elements 12. The cage elements 2 provide spacing between adjacent ones of the rolling elements 12 and guide the rolling elements 12 as they run between the radially inner ring 4 and radially outer ring 8. In a preferred embodiment, each one of the concave outer surfaces 20, 22 has a complementary shape to one of the rolling elements 12.

In one embodiment, each of the concave outer surfaces 20, 22 of the cage elements 2 extends approximately 20% of a pitch diameter of a respective one of the rolling elements 12. One of ordinary skill in the art will recognize that the relationship between the concave outer surfaces 20, 22 of the cage elements 2 and the pitch diameter of the rolling elements 12 can be increased or decreased depending on the performance requirements for a specific rolling bearing assembly.

The cage elements 2 are preferably formed from a polymeric material. One of ordinary skill in the art will recognize that other materials can be used for the cage elements 2. In one embodiment, a first flexible connection area 32 is located between the middle portion 14 and the first end portion 16, and a second flexible connection area 34 is located between the second end portion 18 and the middle portion 14. In one embodiment, a number of the rolling elements 12 in the rolling bearing assembly 1 is equal to a number of the cage elements 2 in the rolling bearing assembly 1.

In one embodiment, each one of the cage elements 2 includes at least one through opening 24 extending from one of the concave outer surfaces 20, 22 through the first or second end portion 16, 18. The at least one through opening 24 is formed in the first end portion 16 in FIG. 4, but one of ordinary skill in the art will recognize that the through opening 24 could be formed in another portion of the cage element 2, such as the second end portion 18 or the middle portion 14. In one embodiment, the first and second end portions 16, 18 each include at least two through openings 26a and 26b, and 28a and 28b. Each one of the cage elements 2 preferably includes at least one common through opening 30 that extends continuously through the middle portion 14 and between the concave outer surfaces 20, 22 of the first and second end portions 16, 18. The through openings 24, 26a, 26b, 28a, 28b, and 30 provide lubricant flow passages which improves lubrication, and reduce friction for the rolling bearing assembly 1. The orientation, size, and shape of the through openings 24, 26a, 26b, 28a, 28b, and 30 can be varied depending on the specific requirements for a particular rolling bearing assembly and are not limited to the arrangement shown in FIGS. 1-7. One of ordinary skill in the art will also recognize that the number of through openings can be varied. The cage elements 2 provide the further advantage in that the same size and shaped cage elements can be used to form cage arrangements in rolling bearing assembly 1 with different diameter rings 4, 8 where the same diameter rolling elements 12 are used, but the number of cage elements 2 is varied.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A cage element for a cage arrangement in a rolling bearing assembly including rolling elements, the cage element comprising:
   an H-shaped body including a cylindrical middle portion a first end portion including a first concave outer surface shaped to support a rolling element and a second end portion including a second concave outer surface shaped to support the rolling element, the first and second end portions defining opposite sides of the H-shaped body and the middle portion defining a connector of the opposite sides of the H-shaped body; and
   the first and second end portions are arranged on opposite ends of the cylindrical middle portion, and the first and second concave outer surfaces have identical curvatures.

2. The cage element of claim 1, further comprising a first flexible connection area between the cylindrical middle portion and the first end portion, and a second flexible connection area between the cylindrical middle portion and the second end portion.

3. The cage element of claim 1, wherein the cage element includes a common through opening that extends continuously through the middle portion and between the first and second concave outer surfaces of the first and second end portions.

4. The cage element of claim 3, wherein the first and second end portions each include at least two through openings extending continuously between the first and second end portions that are distinct from the common through opening.

5. A rolling bearing assembly comprising:
   a radially inner ring defining a radially inner raceway;
   a radially outer ring defining a radially outer raceway;
   a plurality of rolling elements supported between the radially inner raceway of the radially inner ring and the radially outer raceway of the radially outer ring; and
   a cage arrangement formed by a plurality of cage elements, each of the plurality of cage elements arranged between adjacent ones of the rolling elements and including: an H-shaped body including, a first end portion and a second end portion defining opposite sides of the H-shaped body and a middle portion defining a connector of the opposite sides of the H-shaped body, the middle portion extends circumferentially and the end portions are arranged on opposite ends of the middle portion, and the first and second end portions each include a concave outer surface that is shaped to support a respective one of the plurality of rolling elements.

6. The rolling bearing assembly of claim 5, wherein each one of the concave outer surfaces are continuous between outer edges of the end portions and has a complementary shape to one of the rolling elements.

7. The rolling bearing assembly of claim 5, wherein the first and second end portions each have a larger cross-sectional area than a cross-sectional area of the middle portion.

8. The rolling bearing assembly of claim 5, wherein each one of the cage elements includes at least one through opening extending from at least one of the concave outer surfaces through the first or second end portion.

9. The rolling bearing assembly of claim 5, wherein the first and second end portions each include at least two through openings, and each one of the cage elements includes a common through opening that extends continuously through the middle portion and between the concave outer surfaces of the first and second end portions.

10. The rolling bearing assembly of claim 5, wherein a number of the rolling elements in the rolling bearing assembly is equal to a number of the cage elements in the rolling bearing assembly.

11. The rolling bearing assembly of claim 5, wherein each of the concave outer surfaces of the cage elements extends approximately 20% of a pitch diameter of a respective one of the rolling elements.

12. The rolling bearing assembly of claim 5, wherein the first and second end portions are identical.

13. The rolling bearing assembly of claim 5, wherein the rolling elements are spherical rolling elements.

14. The rolling bearing assembly of claim 5, wherein the cage elements are formed from plastic.

15. The rolling bearing assembly of claim 5, wherein the middle portion is cylindrical and intersects each of the end portions in a respective medial region of the end portions.

16. The rolling bearing assembly of claim 5, wherein the first end portion and the second end portion are each configured to support a pitch diameter of each respective one of the plurality of rolling elements.

* * * * *